United States Patent
Dutta et al.

(10) Patent No.: US 11,432,367 B2
(45) Date of Patent: Aug. 30, 2022

(54) METHODS AND SYSTEMS OF SELF-ORGANIZING SATELLITE-TERRESTRIAL NETWORKS

(71) Applicant: ATC Technologies, LLC, Reston, VA (US)

(72) Inventors: Santanu Dutta, Vienna, VA (US); Ajay Parikh, North Potomac, MD (US)

(73) Assignee: ATC Technologies, LLC, Reston, VA (US)

( * ) Notice: Subject to any disclaimer, the term of this patent is extended or adjusted under 35 U.S.C. 154(b) by 0 days.

(21) Appl. No.: 16/881,322

(22) Filed: May 22, 2020

(65) Prior Publication Data

US 2020/0374976 A1 Nov. 26, 2020

Related U.S. Application Data

(60) Provisional application No. 62/852,473, filed on May 24, 2019.

(51) Int. Cl.
 *H04W 84/18* (2009.01)
 *H04B 7/185* (2006.01)
 (Continued)

(52) U.S. Cl.
 CPC ........ *H04W 84/18* (2013.01); *H04B 7/18513* (2013.01); *H04L 5/0073* (2013.01);
 (Continued)

(58) Field of Classification Search
 CPC ... H04W 84/18; H04W 24/02; H04W 72/082; H04W 16/14; H04W 24/10; H04L 5/0073; H04B 7/18513
 See application file for complete search history.

(56) References Cited

U.S. PATENT DOCUMENTS

| 6,269,092 B1 * | 7/2001 | Schilling | H04B 7/2628 370/335 |
| 6,836,673 B1 * | 12/2004 | Trott | H01Q 3/2611 455/67.11 |

(Continued)

OTHER PUBLICATIONS

PCT/US2020/034194 International Search Report and Written Opinion dated Aug. 31, 2020 (11 pages).

*Primary Examiner* — Gary Mui
*Assistant Examiner* — Chuong M Nguyen
(74) *Attorney, Agent, or Firm* — Michael Best & Friedrich LLP

(57) ABSTRACT

Hybrid self-organizing networks. One example system includes a cellular network and a mobile satellite network. The cellular network includes a cellular base station configured to perform at least one cellular interference mitigation measure. The cellular network is configured to provide wireless communications in a first frequency band within a first deployed area. The mobile satellite network includes a mobile satellite network terminal configured to perform at least one satellite interference mitigation measure. The mobile satellite network is configured to provide wireless communications in the first frequency band within a second deployed area separated from the first deployed area by a first standoff distance. Performance of one or both of the at least one cellular interference mitigation measure and the at least one satellite interference mitigation measure results in a second standoff distance that is less than the first standoff distance.

43 Claims, 14 Drawing Sheets

(51) Int. Cl.
   *H04W 24/02* (2009.01)
   *H04W 16/14* (2009.01)
   *H04W 72/08* (2009.01)
   *H04L 5/00* (2006.01)
   *H04W 24/10* (2009.01)

(52) U.S. Cl.
   CPC ........... *H04W 16/14* (2013.01); *H04W 24/02* (2013.01); *H04W 24/10* (2013.01); *H04W 72/082* (2013.01)

(56) References Cited

U.S. PATENT DOCUMENTS

| | | |
|---|---|---|
| 10,349,332 B2* | 7/2019 | Agee .................... H04W 72/085 |
| 2005/0136836 A1* | 6/2005 | Karabinis ............ H04B 7/1851 455/12.1 |
| 2010/0220780 A1* | 9/2010 | Peng ........................ H04B 3/23 375/345 |
| 2011/0032173 A1* | 2/2011 | Chang ...................... H01Q 3/04 343/880 |
| 2011/0188586 A1 | 8/2011 | Bidigate et al. |
| 2015/0072699 A1 | 3/2015 | Frederiksen et al. |
| 2015/0131703 A1* | 5/2015 | Balter .................... H04B 1/715 375/135 |
| 2016/0006837 A1* | 1/2016 | Reynolds ................ H04L 67/42 709/203 |
| 2016/0057679 A1 | 2/2016 | Werner et al. |
| 2017/0013476 A1* | 1/2017 | Suthar ................... H04W 24/08 |
| 2017/0171762 A1* | 6/2017 | Reis .................... H04W 72/082 |
| 2018/0302807 A1 | 10/2018 | Chen et al. |
| 2018/0316416 A1* | 11/2018 | Reis ........................ H01Q 3/02 |
| 2019/0013914 A1* | 1/2019 | Xu ....................... H04L 27/2613 |
| 2019/0239082 A1* | 8/2019 | Ravishankar ......... H04W 48/16 |

* cited by examiner

METHODS AND SYSTEMS OF SELF-ORGANIZING SATELLITE-TERRESTRIAL NETWORKS

FIELD

Embodiments described herein relate to satellite and terrestrial wireless communications systems and, more particularly, to mitigating cochannel and adjacent channel interference between a terrestrial network and a mobile satellite network, operating in spectral and geographical proximity.

SUMMARY

Satellite communications systems and methods are widely used for communications with user equipment, for example, mobile satellite system (MSS) terminals. Satellite communications systems and methods generally employ at least one space-based component, such as one or more satellites that are configured to wirelessly communicate with user and hub, or gateway, equipment on the Earth.

Some satellite communications systems use a single satellite antenna pattern (e.g., a beam or cell) to cover an entire service region served by the system. Alternatively, or in combination with the above, in cellular satellite communications systems, multiple satellite beams are provided, each of which can serve a substantially distinct service sub-region within an overall service region, to collectively provide service to the overall service region. Thus, a cellular architecture that is similar to that used in conventional terrestrial cellular systems can be implemented using cellular satellite-based systems. In such systems, the satellite typically communicates with mobile terminals over a bidirectional communications service link, with terminal communications signals being communicated from the satellite to the terminal over a downlink or forward link (also referred to as a forward service link), and from the terminal to the satellite over an uplink or return link (also referred to as a return service link). In addition to the service links, the satellite network may also include feeder links connecting the satellite to hubs, or gateways, which provide access to the satellite network by other networks, such as terrestrial cellular networks and the internet. Like the service links, the feeder links also comprise a forward uplink (hub to satellite) and a return downlink (satellite to hub).

The overall design and operation of satellite communications systems are well known to those having skill in the art, and need not be described further herein. Moreover, as used herein, the term "terminal" includes cellular or satellite radiotelephones or data terminals, including smart telephones and access points for internet of things (IoT), wherein the terminal includes a radio frequency transceiver and may also include a global positioning system (GPS) or global navigation satellite system (GNSS) receiver.

Terrestrial wireless communications systems, for example, long term evolution (LTE) cellular networks, use base stations to provide wireless communications to and between mobile wireless devices, including, for example, smart phones, computers and IoT devices.

Some terrestrial wireless communications systems and satellite communications systems operate in spectral and geographic proximity, which leads to the potential for radio frequency interference. For example, a satellite terminal transmitter near a terrestrial base station receiver may interfere with the base station receiver. In another example, a terrestrial base station transmitter operating near a satellite terminal receiver may interfere with the terminal receiver. The potential for interference from terrestrial base stations may affect the operation of mobile satellite terminals, restricting or preventing their operation in proximate geographic areas. This limits what otherwise would be more pervasive downlink coverage for the mobile satellite network within an area. Similarly, the potential for interference from a mobile satellite terminal to a cellular base station receiver may affect the uplink coverage of the cellular network. Accordingly, embodiments presented herein provide composites of terrestrial wireless networks and mobile satellite networks forming hybrid self-organizing networks (hybrid SONs). Hybrid SONs utilize interference mitigation technologies (for example, antenna null steering in satellite terminals and terrestrial base stations, base station interference cancellation, intelligent resource scheduling, and the like). Such hybrid SONs operate to mitigate mutual interference between the satellite and terrestrial components, or networks, of a composite hybrid network, or between stand-alone satellite and terrestrial networks, thereby reducing the areas of restriction, providing more pervasive coverage for both satellite and terrestrial networks.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The figures use LTE as an example of a terrestrial cellular network, although the methods of the present invention can be applied equally to terrestrial cellular networks operating according to other standards, for example, 5G. The methods are not dependent on any aspect of the air interface specifications. Also, the narrative often uses "cellular" as a shorthand for "terrestrial cellular," and "MSS" and "satellite" are used interchangeably.

Figure 1:
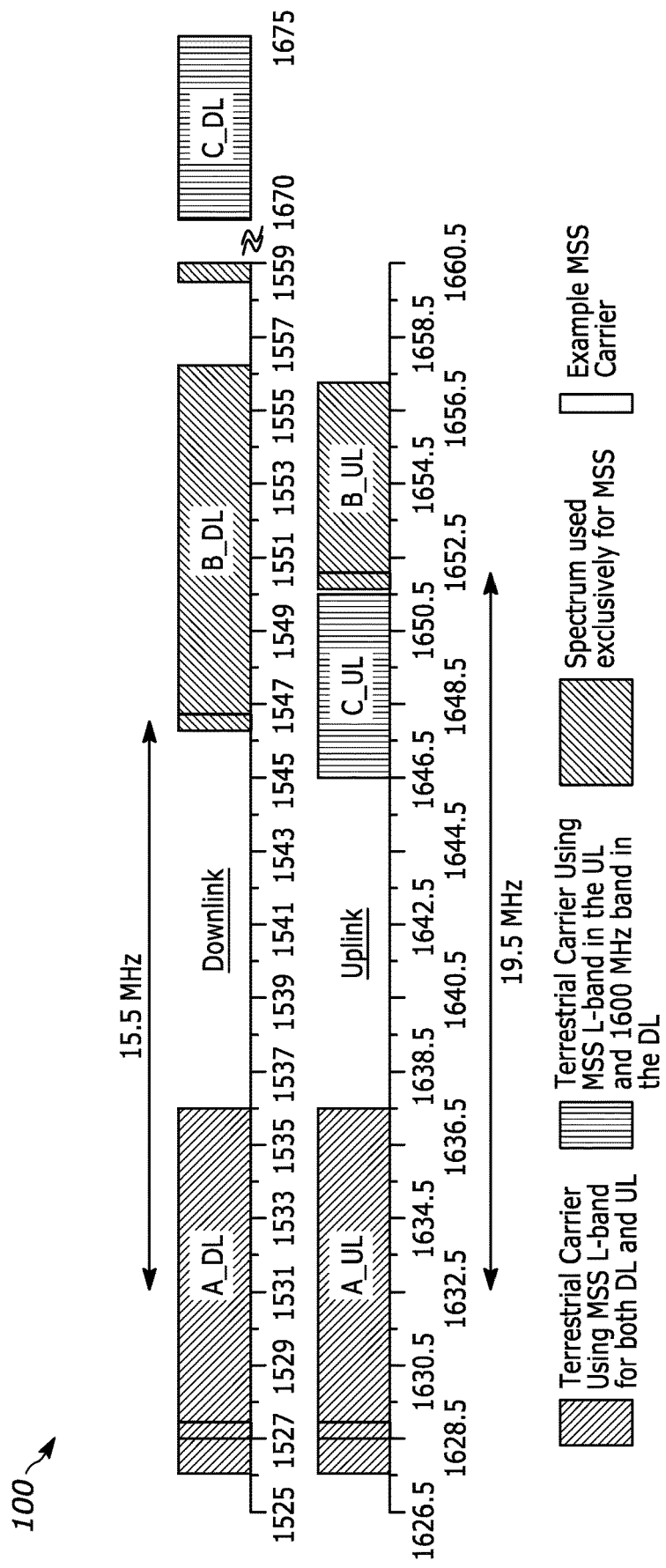
FIG. 1 illustrates the allocations of a radio frequency spectrum shared between a terrestrial cellular network and a mobile satellite network, according to some embodiments.

Skilled artisans will appreciate that elements in the figures are illustrated for simplicity and clarity and do not include details that are known in the prior art, nor are they drawn to scale. For example, the dimensions of some of the elements in the figures may be exaggerated relative to other elements to help to improve understanding of embodiments of the present invention. Also, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software-based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronics based aspects of the invention may be implemented in software (e.g., stored on non-transitory computer-readable medium) executable by one or more processors. As such, it should be noted that a plurality of hardware and software-based devices, as well as a plurality of different structural components, may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

As noted, some terrestrial wireless communications systems and satellite communications systems may operate in spectral proximity, geographic proximity, or both. FIG. 1 illustrates an example radio frequency spectrum allocation 100 between a terrestrial cellular network and a mobile satellite network (MSS). Embodiments presented herein are provided as examples; they should not be interpreted as plans or suggestions for any specific commercial deployment. Furthermore, it should be understood that the methods taught can be used to bias interference protection to favor the satellite network, the cellular network, or to share the cost of providing the mutual protection. How the cost is shared between a satellite and terrestrial network depends on how the methods are applied in an actual implementation—no particular cost-sharing approach is advocated herein.

Figure 2:
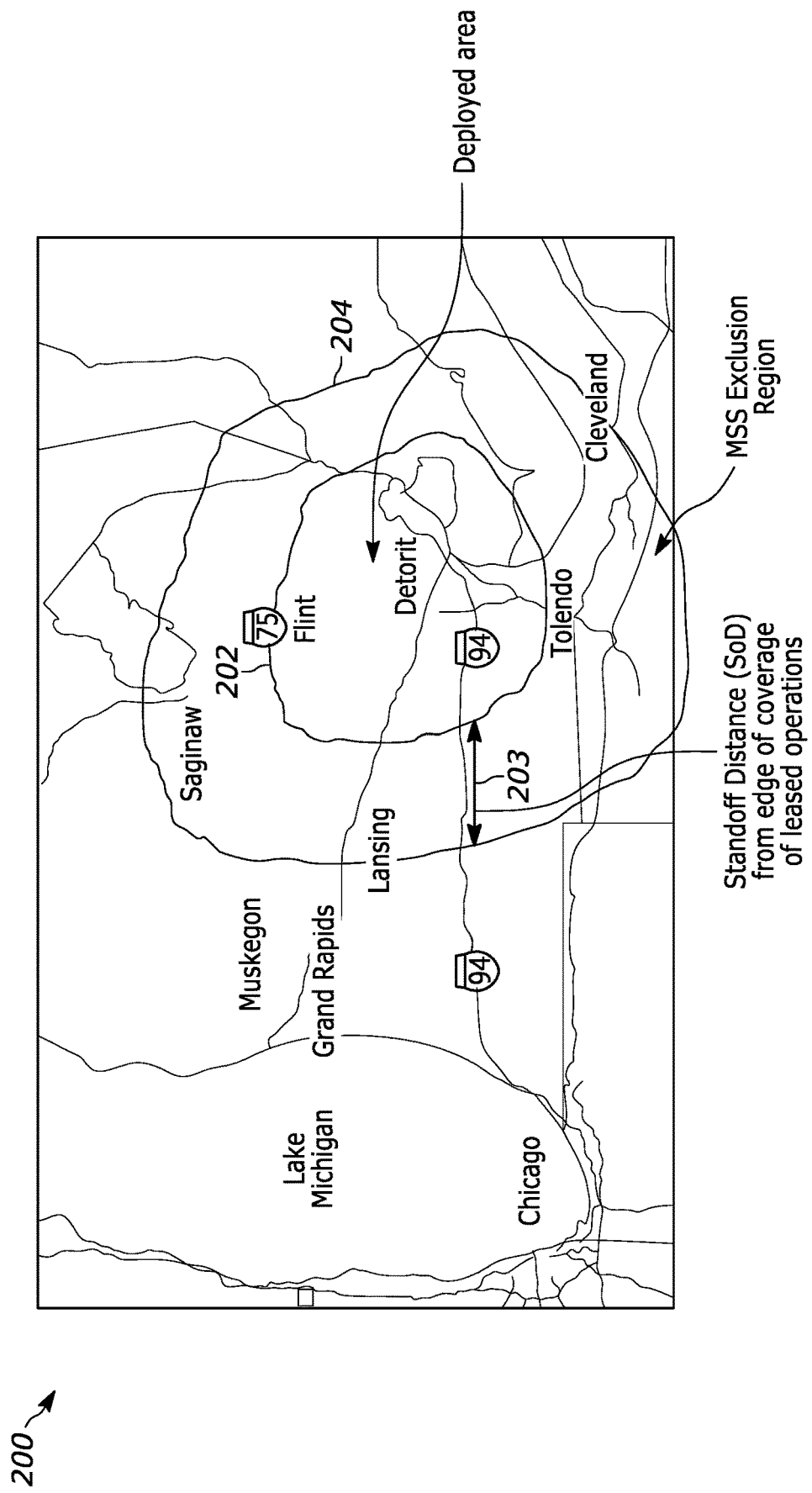
FIG. 2 is a map of an exclusion region where a terrestrial cellular network and a mobile satellite network, using the spectrum allocation of FIG. 1, may experience coexistence challenges, according to some embodiments.

By way of example, suppose that the terrestrial cellular network is deployed in the Detroit, Mich market service area (MSA) 200 (See FIG. 2). The cellular network operates in the mobile satellite network L-band spectral segment A. In the example illustrated, spectral segment A is to be used for terrestrial frequency-division duplexing (FDD) operations. Spectral segment A may also be used for MSS frequency-division duplexing (FDD) operations anywhere in North America, provided the terrestrial cellular network and the MSS network can be protected from mutual interference. The terrestrial cellular network may invoke measures to minimize interference to the satellite network and the satellite network may do likewise relative to the terrestrial cellular network, as discussed herein.

Spectral segment B is, in the present example, reserved exclusively for frequency division duplexed (FDD) MSS anywhere in North America, subject to affording protection to the terrestrial cellular networks in their designated coverage areas.

Spectral segment C, using the MSS L-band in the uplink and the 1600 MHz band in the downlink, is used for a separate terrestrial FDD operations from that using spectrum segment A. Spectrum segment C comprises an uplink in the MSS L-band (1646.5-1651.5 MHz) and a downlink in the 1670-1675 MHz band. The downlink frequencies for each segment are indicated by the designation "DL." The uplink frequencies for each segment are indicated by the designation "_UL." As illustrated in FIG. 1, MSS channels may be deployed anywhere in the MSS L-band, either on a stand-alone basis, or based on cochannel sharing of spectrum with a terrestrial wireless network.

Again, as an example, assume that the MSS uplink carrier has a bandwidth of 200 kHz with a guard band of 0.5 MHz. As illustrated in FIG. 1, one example MSS uplink carrier in the B_UL band is adjacent to the cellular uplink carrier in C_UL band. To assure bidirectional (downlink and uplink) compatibility between the cellular and MSS networks, a geographical separation metric is used, known as a Standoff Distance (SoD). In one example, as illustrated in FIG. 1, where the cellular network and the MSS channel are co-channel on spectral segment A, downlink interference from a cellular base station to a satellite terminal receiver can be avoided when a certain SoD is maintained, wherein the SoD depends on the cellular and MSS air interfaces. A typical value using current air interfaces, such as LTE for cellular and a present MSS air interface, is 62 km. In another example, where the MSS channel is on spectral segment B and the cellular network is on spectral segment A, a smaller SoD of, typically, 16 km is required.

The difference in SoD values in the two examples arises from the differences in cochannel and adjacent channel interference scenarios. Specifically, in the case of cochannel interference, the full in-band spectral density of the base station is reflected as the received interference spectral density at the satellite receiver; in the case of adjacent channel interference, the adjacent channel interference spectral density of the base station, also known as out-of-channel-emission (OOCE) is the source of the interference. The above SoD values are representative of the present state of the art. The effectiveness of the embodiments presented herein may be judged in part by how these SoD values are reduced.

The SoD is used to determine the minimum geographical separation required between networks to maintain mutual compatibility. For example, as illustrated in FIG. 2, the cellular network operates in the Deployed Area 202 (the 'coverage area' of the cellular network). The Deployed Area 202 plus an annular region around the Deployed Area 202, with a width corresponding to the SoD 203, forms an exclusion region 204, in which satellite terminals cannot operate without the potential of causing interference to, or receiving interference from, the cellular network's base stations or user equipment. To prevent such interference, satellite terminals ordinarily must not operate inside of the exclusion region. This prevents achieving "pervasive bidirectional coverage" for the MSS network. As used herein, the term "pervasive coverage" has been defined as an SoD of 75 m or less between a satellite terminal and a cellular base station, or an SoD of 1 m or less between a satellite terminal and a cellular terminal.

Figure 3:
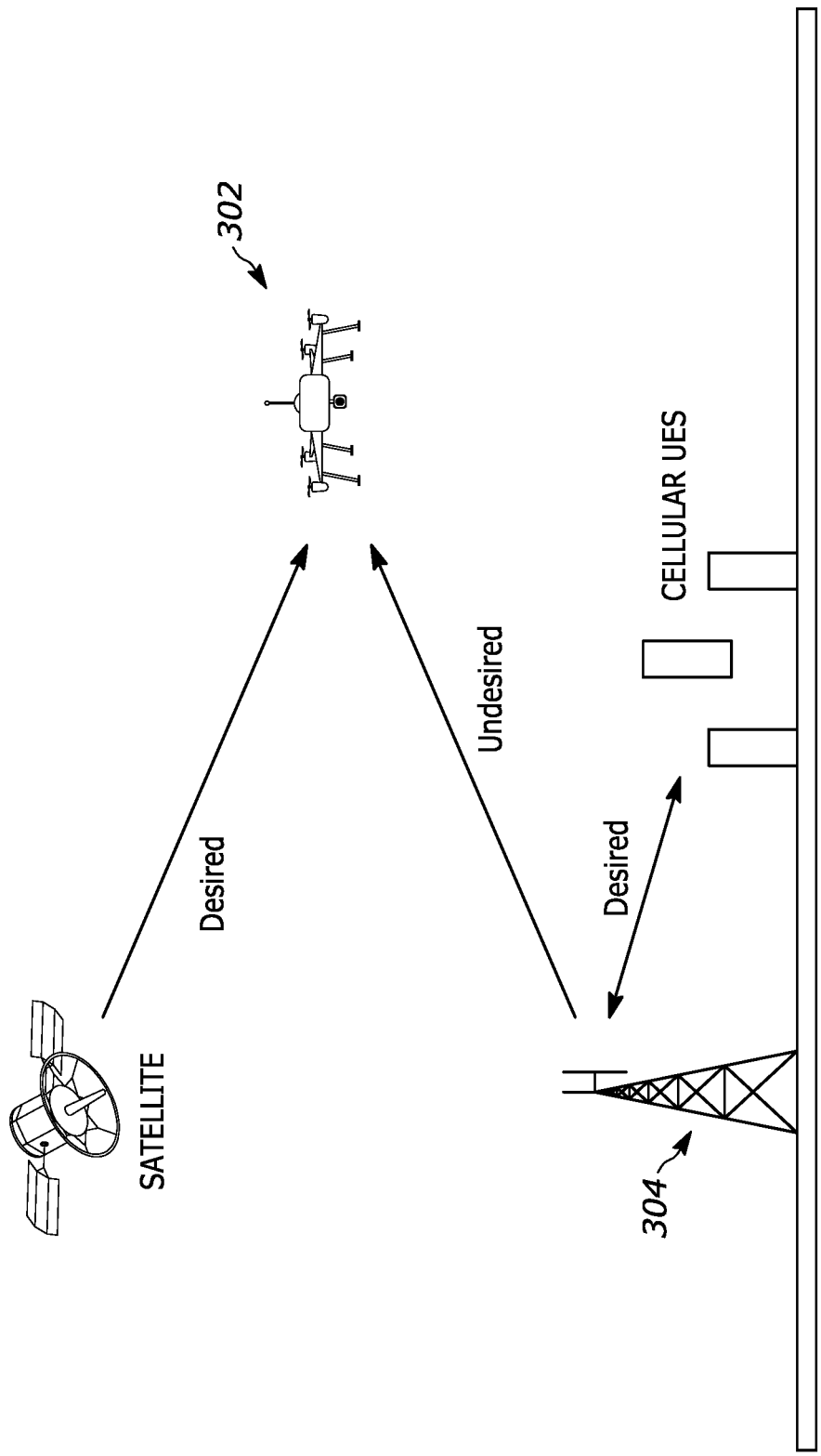
FIG. 3 illustrates the potential interaction between a terrestrial cellular network and a mobile satellite network, according to some embodiments.

As illustrated in FIG. 3, when a satellite terminal 302 operates within the exclusion region, it may suffer interference from the cellular base station 304. In the example illustrated, the satellite terminal 302 is carried on or integrated with an Unmanned Airborne Vehicle (UAV), also referred to as a drone. The transmissions from the cellular base station 304 produce undesired signals at the receiver of the satellite terminal 302. As described in detail below, the cellular network and MSS network may be operated as a hybrid Self-Organizing Network (SON) to reduce the stand-off distance (SoD) of the drone from the Detroit Metropolitan Service Area (MSA), referred to as the Deployed Area in FIG. 2, at which the satellite terminal can be used without causing or receiving harmful interference.

In some embodiments, the SON includes an adaptive receive-null-steering satellite terminal, which can reduce the SoD substantially, for example to 8 km, by reducing the downlink interference to the satellite terminal receiver from the cellular base station. In the example illustrated in FIG. 3, the drone incorporates a satellite terminal, which is communicating with its control station via a satellite, using a relatively narrowband signal (for example, 200 kHz bandwidth). When the drone is proximate to a cellular base station, it may receive the cellular interference signal through a sidelobe of the satellite terminal's antenna. In some embodiments, the adaptive receive-null-steering function of the satellite terminal will adaptively reduce the gain of the satellite terminal's antenna towards base station antenna as the drone flies past the base station.

Figure 4:
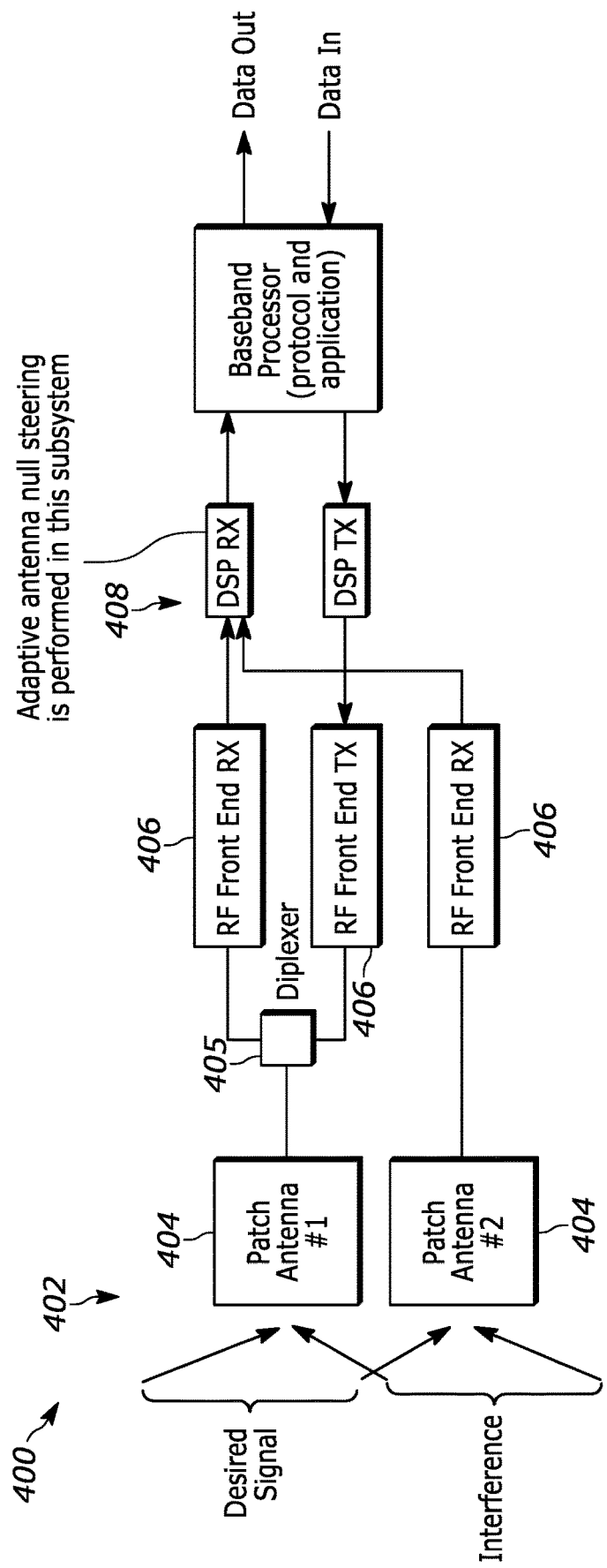
FIG. 4 is a block diagram of a mobile satellite network terminal, according to some embodiments.
Figure 5:
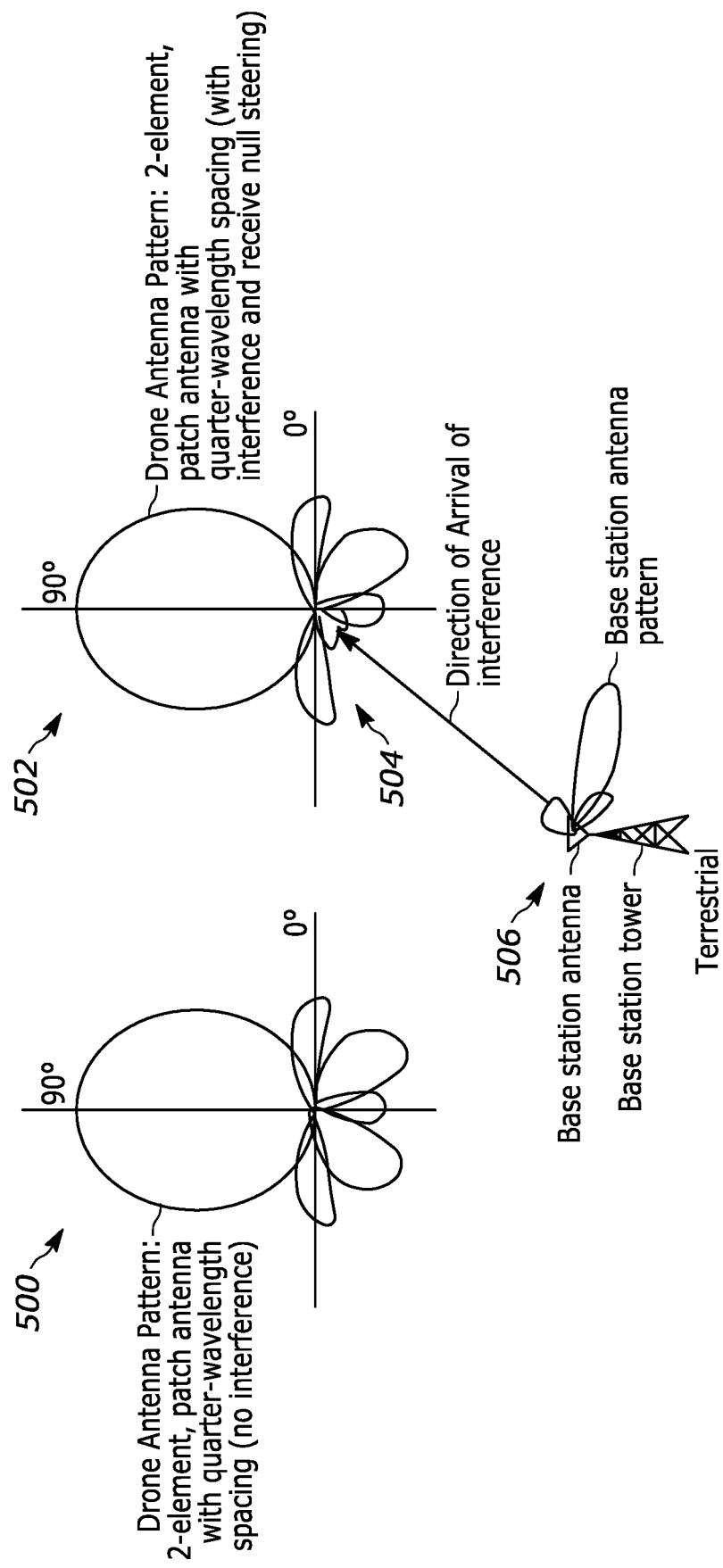
FIG. 5 illustrates a receive null steering operation performed by the mobile satellite network terminal of FIG. 4 to mitigate interference from a terrestrial cellular base station, according to some embodiments.

FIG. 4 is a block diagram of an example embodiment of a satellite terminal 400. As illustrated, the satellite terminal includes a 2-element, quarter-wavelength-spaced array 402 of patch antennas 404. The signals received by the two antennas 404 (and routed through the diplexer 405 as illustrated) are amplified and filtered in separate RF front ends 406. The received signals are synchronously digitized by A/D converters and delivered as complex baseband I/Q samples to a digital signal processor (DSP) Rx subsystem 408 for receive processing. The DSP Rx subsystem 408 performs spatial signal processing to adaptively point antenna pattern nulls towards the source of the interference (the cellular base station). FIG. 5 illustrates an antenna pattern 500 for the patch antenna array with no interference, and an antenna pattern 502 for the patch antenna array with interference and the resulting adaptive null 504 in the antenna pattern (pointed toward the interfering base station 506). In a cochannel scenario, steering a null in the direction of the cellular base station increases the S/(N+1) of the received satellite signal, leading to a substantial reduction of the SoD, for example, a 20 dB null may reduce the SoD to approximately 8 km. In an adjacent channel scenario, based on the typical out-of-channel-emission (OOCE) characteristics of LTE base stations, typical overload thresholds of MSS receivers, and a 15.5 MHz frequency offset as shown in FIG. 2, the satellite terminal (drone) may operate at a SoD of approximately 112 m to avoid uplink interference.

In some embodiments, improving the RF characteristics of the satellite terminal and the cellular base station can further reduce the SoD. For example, the SoD can be reduced to a value such as 75 m, resulting in materially pervasive coverage as defined above, by the following measures, implemented either singly or jointly: (i) improving the base station transmitter's OOCE, so as to keep the noise floor rise at the receiver below an acceptable threshold level; and (ii) improving the satellite receiver's overload threshold by a combination of improved frequency selectivity and/or linearity. Measure (ii) may be more important than (i) if front end overload of the receiver (known as blocking), caused by the adjacent-band power entering the receiver's pre-selector, is the predominant cause of the receiver's signal-to-noise-and-interference ratio (SNIR) degradation compared to the same caused by OOCE from the cellular transmitter.

In some embodiments, the adaptive antenna null steering includes utilizing a known pilot signal in the MSS downlink to form a Minimum Mean Squared Error (MMSE) based antenna pattern in the receiver's DSP subsystem. Pointing a null towards the interference occurs automatically, as this is required to minimize the mean squared error between a received pilot signal, embedded in the downlink signal from the satellite, and a replica of the pilot generated locally by the receiver. The pilot signal may be a pseudo-random noise sequence (PN sequence) that is embedded in the MSS downlink signal by one of a variety of means, for example, additive (the pilot and desired signal are added together before transmission), time multiplexing of the pilot and desired signals, and multiplicative combining (the desired signal is multiplied with the pilot signal, which is equivalent to binary phase modulation of the desired signal by a bipolar pilot signal).

Figure 6A:
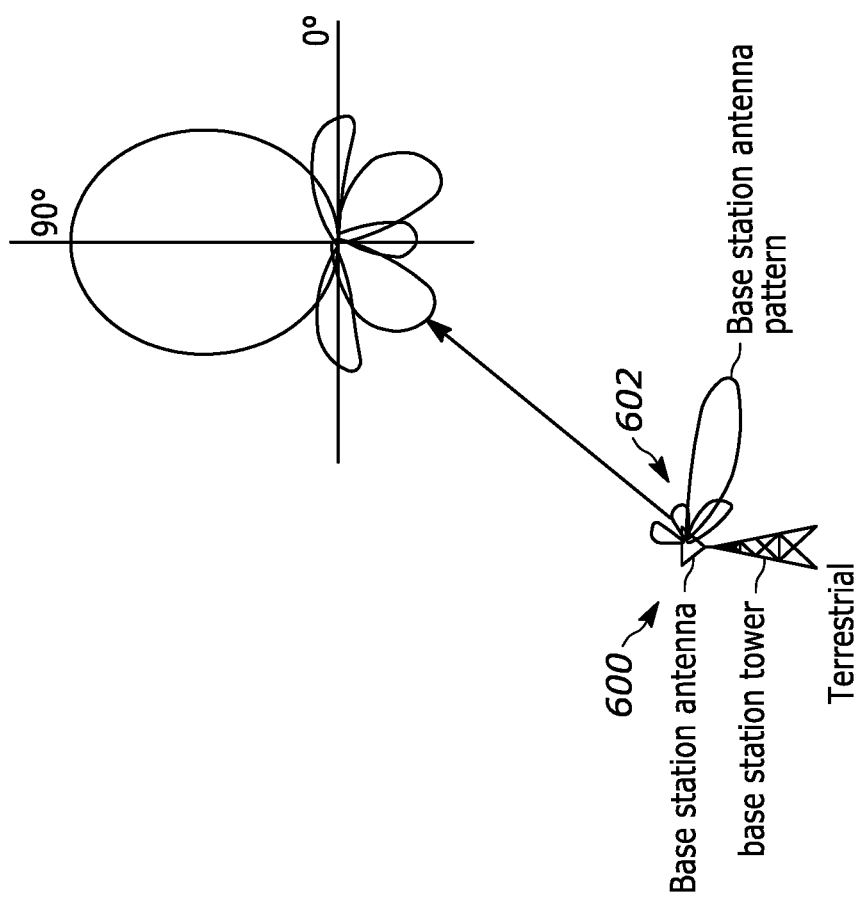
FIG. 6A illustrates an adaptive retrodirective transmit null steering operation performed by the terrestrial cellular base station of FIG. 5 to mitigate interference to a mobile satellite network terminal, according to some embodiments.

In other embodiments, in addition to, or instead of, the drone's satellite terminal steering a receive null towards the cellular base station antenna, the cellular base station 600 could automatically steer a retrodirective transmit antenna-pattern-null 602 towards the drone, as illustrated in FIG. 6A.

In one example embodiment, the base station antenna has an adaptive receive antenna array, which steers a null towards the drone's transmit signal. The drone transmit signal may be co-channel or adjacent channel with respect to the base station's own cellular uplink spectrum. The base station determines the Angle of Arrival (AoA) of drone's signal from the direction of the null (that is, the base station's receiver functions as a direction finder). Using knowledge of RF calibration of the transmit and receive subsystems of the cellular base station, and knowledge of the AoA of the drone's signal, the transmit subsystem of the base station synthesizes a pattern null towards the drone, using the cellular base station antenna array.

Figure 6B:
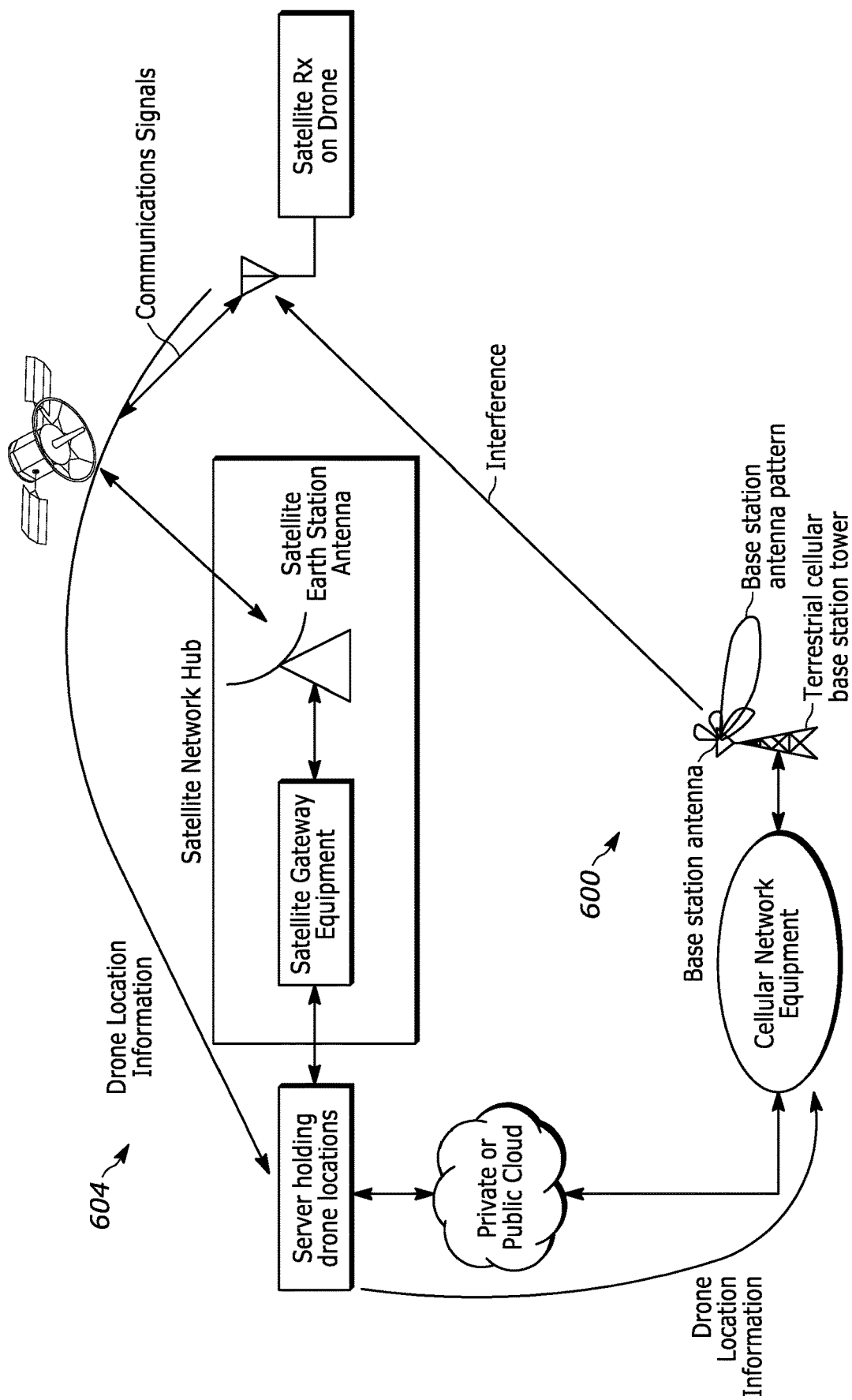
FIG. 6B illustrates a retrodirective transmit null-steering operation performed by a terrestrial base statin based on known location of a victim receiver, according to some embodiments.

In another embodiment, the transmit antenna pattern is formed in an open loop method by determining the drone's location in three dimensions. A commercially available direction finder, communicatively coupled to the cellular base station, may be used to determine the direction towards the drone. The drone's location may also be determined by the drone itself, using an onboard navigation system (for example, a global navigation satellite system). The drone reports its position periodically to a server connected to both the satellite and cellular networks. The cellular base station controls the open-loop null steering of the base station's antenna based on the drone location data retrieved from the server or from the direction finder coupled to the base station. FIG. 6B illustrates a system block diagram 604 for the concept where the drone's location is fetched by the base station from a server.

Figure 7:
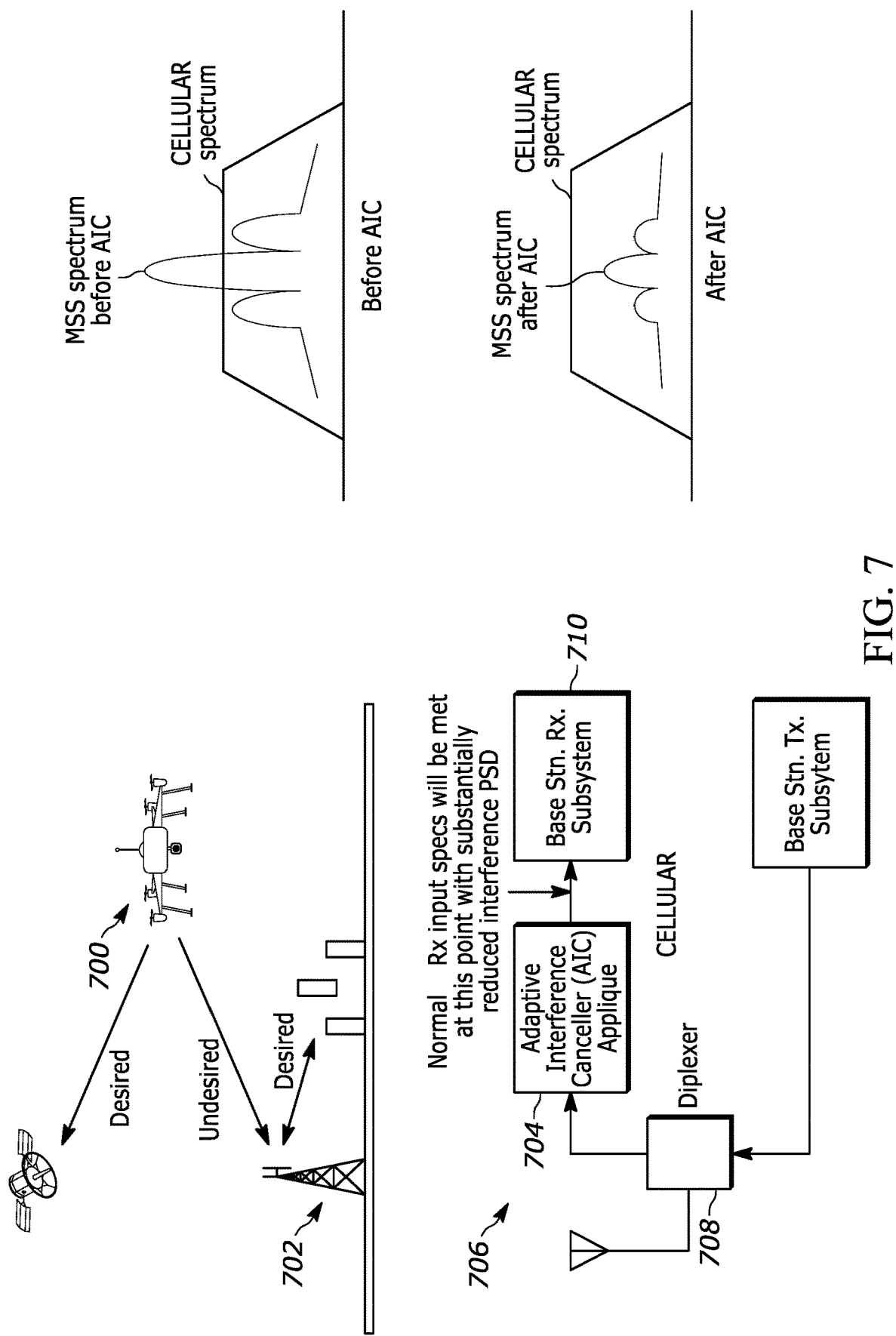
FIG. 7 illustrates a reduction of mobile satellite network interference to a terrestrial cellular base station receiver using adaptive interference cancellation, according to some embodiments.

Interference may also be caused by a satellite terminal to a cellular base station receiver. For example, as illustrated in FIG. 7, a drone 700 is flying within an area served by a cellular base station 702 that is using a frequency that is co-channel or adjacent channel with respect to the MSS frequency used by the drone 700. Consequently, the drone's uplink transmissions could cause interference to the cellular base station receiver. The possibility of interference is greater, compared to cellular terminals at the same separation distance, because a satellite terminal's transmit power levels are typically greater than those of cellular terminals. However, mitigating this factor is the fact that L-band MSS channel bandwidths (typically under 300 kHz) are usually smaller than those of cellular (typically 10 MHz or greater). To mitigate such interference, an Adaptive Interference Canceller (AIC) 704 may be used. The AIC 704 may be implemented in hardware, software, or both. When implemented in hardware, the AIC 704 may be used as an "applique" (drop-in subsystem) in the front end of a cellular base station's receive subsystem. For example, as illustrated, the AIC applique 704 is installed in a cellular base station 706 between the antenna diplexer 708 and the cellular base station receive subsystem 710. This allows for retrofitting existing cellular base stations without altering the receive subsystem software of such base stations.

If changes were allowed in cellular base station software, receive null steering could be used in the cellular base stations instead of the AIC 704. However, it is preferable from the perspective of the satellite network operators not to demand accommodation in the software of the LTE base stations. This is because LTE has much greater scale than satellite network ecosystems. Therefore, an applique approach, as shown in FIG. 7, may be advantageous over receive null steering in the cellular base stations.

Figure 8:
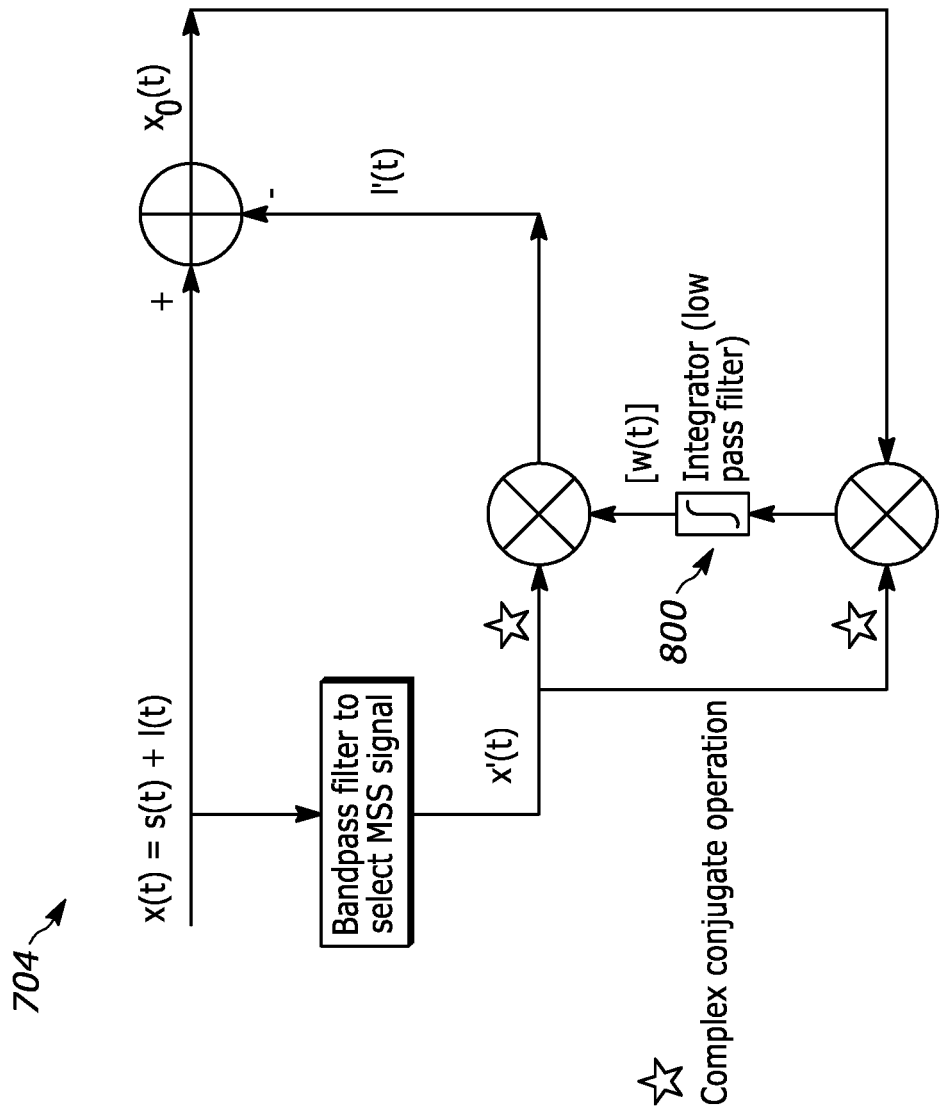
FIG. 8 is a block diagram of an adaptive interference canceller, according to some embodiments.

Referring to FIG. 8, the AIC 704 substantially reduces the interference signal power, so that the S/(N+1) at its output is significantly greater than at its input. The AIC 704 operates by optimally estimating the interference waveform from a combination of interference, desired signal and background noise, referred to as the composite waveform, x(t), and then subtracting the estimated interference waveform, I'(t), from the composite waveform, x(t), to create a new composite, output signal $x_0(t)$, with reduced interference content. In some embodiments, the estimation is performed by the following steps. The input signal is bandpass filtered to increase the MSS signal content in the composite signal relative to the cellular signal content, as illustrated in FIG. 8. This is possible because the MSS signal has a smaller bandwidth than the cellular signal. The filtered x(t) is referred to as x'(t). Once filtered, the signal is processed according to the operation illustrated in FIG. 8 (using complex baseband notation). The operation involves forming the complex weight, w(t) as per equation (1) below. In some embodiments, the equation may be implemented with digital signal processing.

$$w(t)=f\{x'w\}*x_0(t) \qquad (1)$$

In some embodiments, the "integrator" 800 is implemented with a low pass filter whose bandwidth should be chosen to be small compared to the bandwidth of the cellular signal but pass the main spectral contents of the MSS signal. This requires that the satellite signal bandwidth should be small compared to that of the cellular signal.

Figure 9:
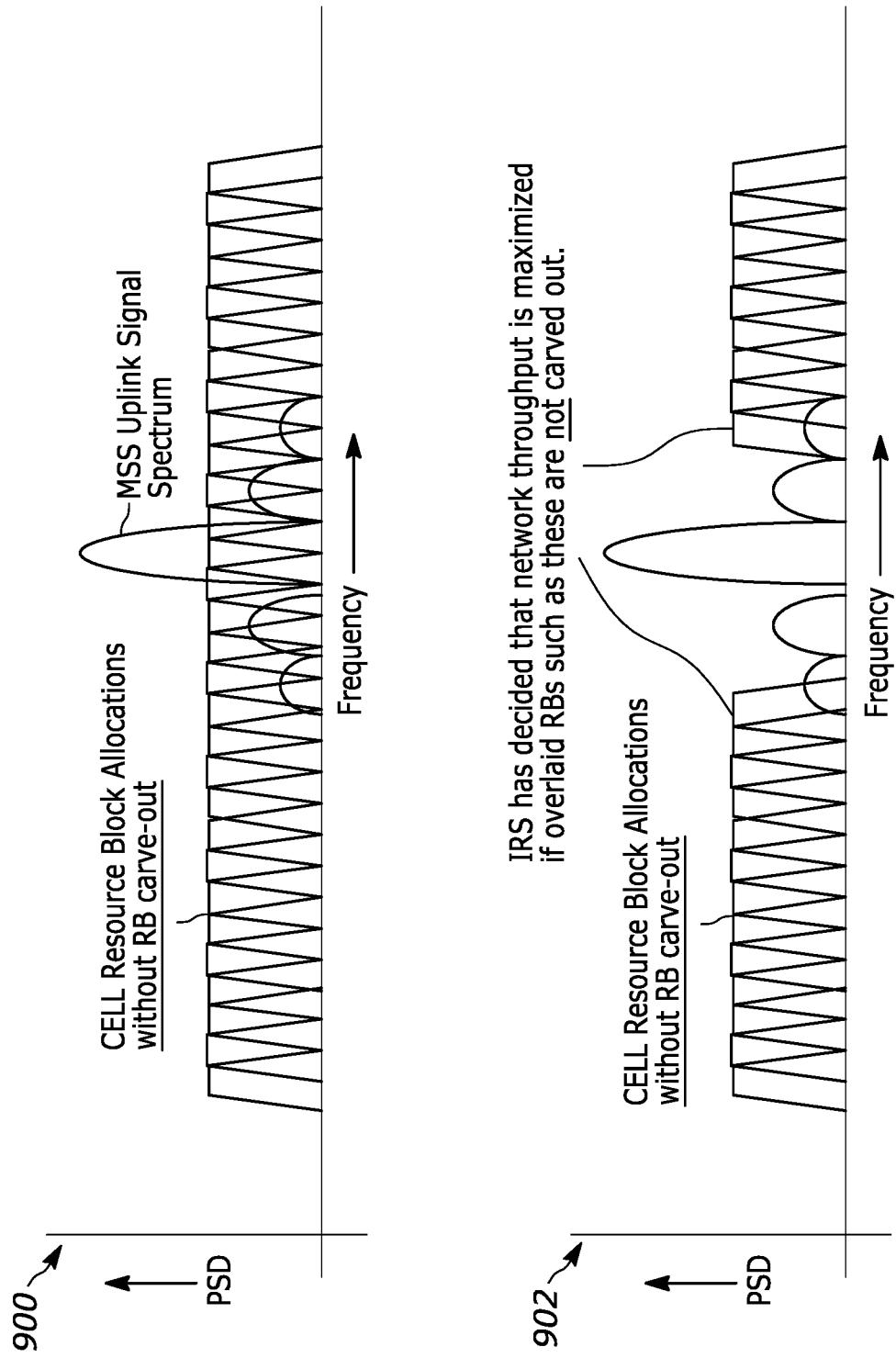
FIG. 9 illustrates a cellular resource block carve-out using an intelligent resource scheduler where the cellular network uses a cellular or similar air interface, according to some embodiments.

In some embodiments, intelligent radio access network (RAN) resource schedulers are implemented to reduce interference. As noted, the MSS signal typically occupies a small fraction of the cellular signal's bandwidth. Furthermore, the cellular protocol often (as in LTE and 5G) involves frequency hopping of a resource block across the cellular channel bandwidth. If the RAN Resource Scheduler is made aware of the transmit spectrum of the MSS uplink signal, an Intelligent Resource Scheduler (IRS) can determine if it would be advantageous to exclude the resource blocks (RBs) that are occupied by the MSS signal's spectrum, for example, as illustrated in FIG. 9 (See spectrum diagrams 900 and 902).

It should be noted that, for some threshold value of received power spectral density (PSD) of the MSS signal, the IRS may determine that the optimal choice from the perspective of layer-2 throughput would be to not carve out some resource blocks, as resource block carve out reduces the capacity of the network—the IRS may find it preferable to cope with the interference based on its existing resources for interference mitigations. Examples of the such resources include error detection and correction (EDAC), blind repetition, and hybrid automatic repeat request (HARQ). The above embodiment is illustrated in FIG. 9 by showing two RBs nearest to the MSS spectrum accepting cochannel interference.

Figure 10:
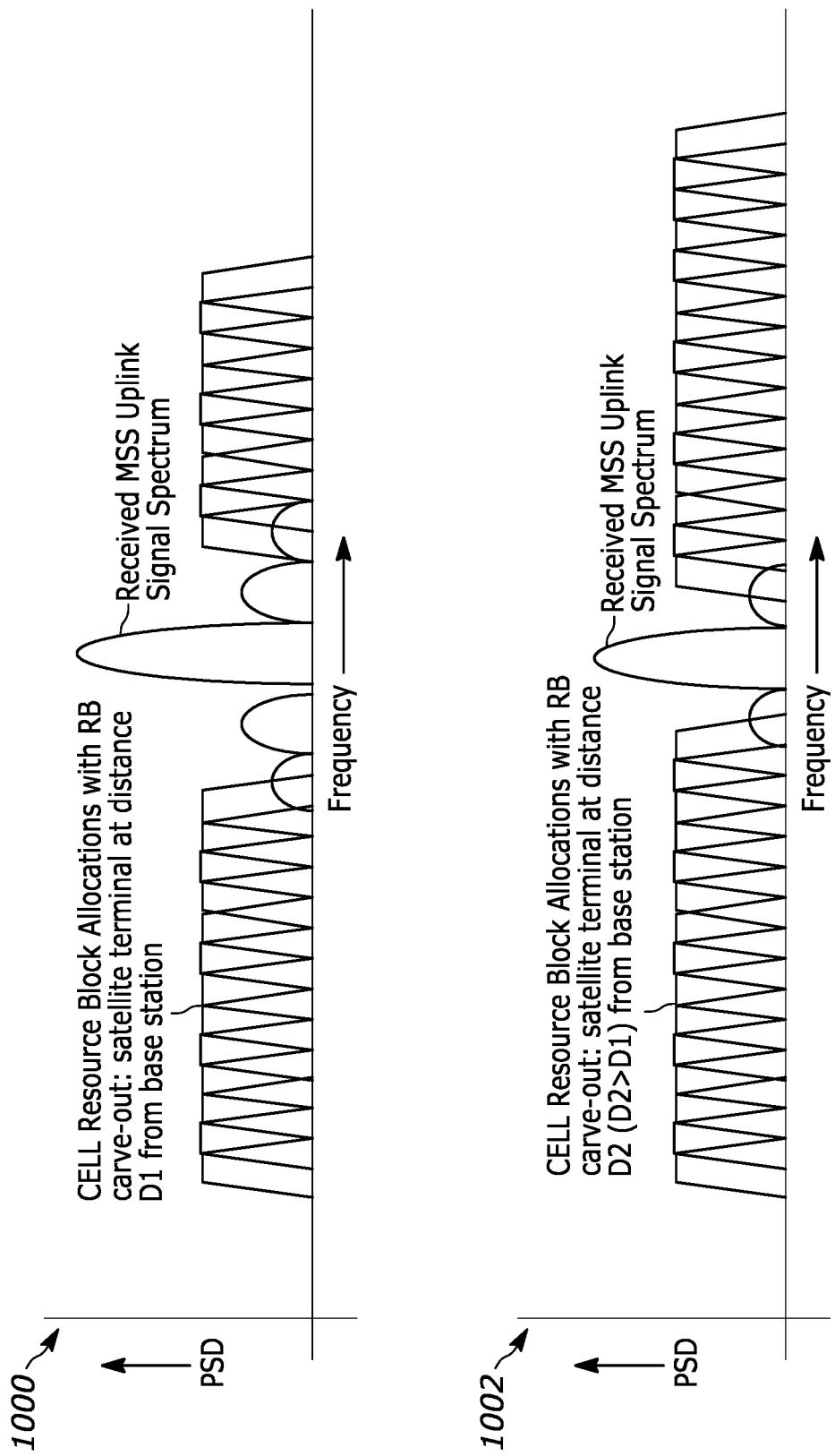
FIG. 10 illustrates a separation-distance dependent cellular resource block carve-out using an intelligent resource scheduler where the cellular network uses a cellular or similar air interface, according to some embodiments.

As noted, a satellite terminal's uplink transmissions may cause interference to a cellular base station receiver sharing a band with the satellite terminal. The sharing may be co-channel or adjacent channel, the interference being greater in the former case. Accordingly, some embodiments implement satellite-terminal-location aware, coordinated resource allocation between standalone terrestrial and satellite networks, or networks of a hybrid satellite-terrestrial network, to mitigate the said interference. Resource block carve out, as described above, is an example of such coordination. The carve out can be fixed, that is time invariant, or dynamically adaptive to the location of the satellite terminal. In some embodiments, information about the satellite terminal's location is provided to the terrestrial IRS by the MSS IRS if the satellite air interface protocol or an application supports reporting the position of the satellite terminal to the MSS IRS. The approach for sharing of satellite terminal location between the satellite and cellular networks may be similar to the embodiment illustrated in FIG. 6B When the terrestrial IRS is aware of the location of the satellite terminal, it can determine the carve out based on the proximity of the satellite terminal to the terrestrial base station, as illustrated in FIG. 10 (See spectrum diagrams 1000 and 1002). More resource blocks may need to be carved out when the satellite terminal is closer to the base station, with carve out being unnecessary when the satellite terminal is more than a threshold distance from the base station. It is noteworthy that modern cellular air interfaces, such as LTE and 5G, can dynamically throttle their capacities to accommodate variations in other-network interference. This ability for the cellular network capacity to "breathe" can be utilized in the IRS to accommodate transient occurrences of interference from proximate satellite terminals.

The threshold distance, as well as the received signal to interference (S/I) power ratio, may be based on either (i) knowledge of the location of the satellite terminal used in conjunction with an assumed RF propagation model, or (ii) sensing interference actually received from the satellite terminal. In some embodiments, method (ii) is preferred because propagation models are statistical and may result in predictions that do not sufficiently match reality. The sensing of the satellite terminal's signal may be based on detecting a known pilot signal in the satellite's air interface using correlation, and a suitably long integration time period. Longer integration times allow the signal to be detected at lower signal to noise power ratios. However, the integration time is ultimately limited by the coherence time of the channel and the phase stability of the base station's receiver. A combination of coherent and incoherent integration may be used to improve the reliability with which the satellite terminal's received power is sensed.

Figure 11:
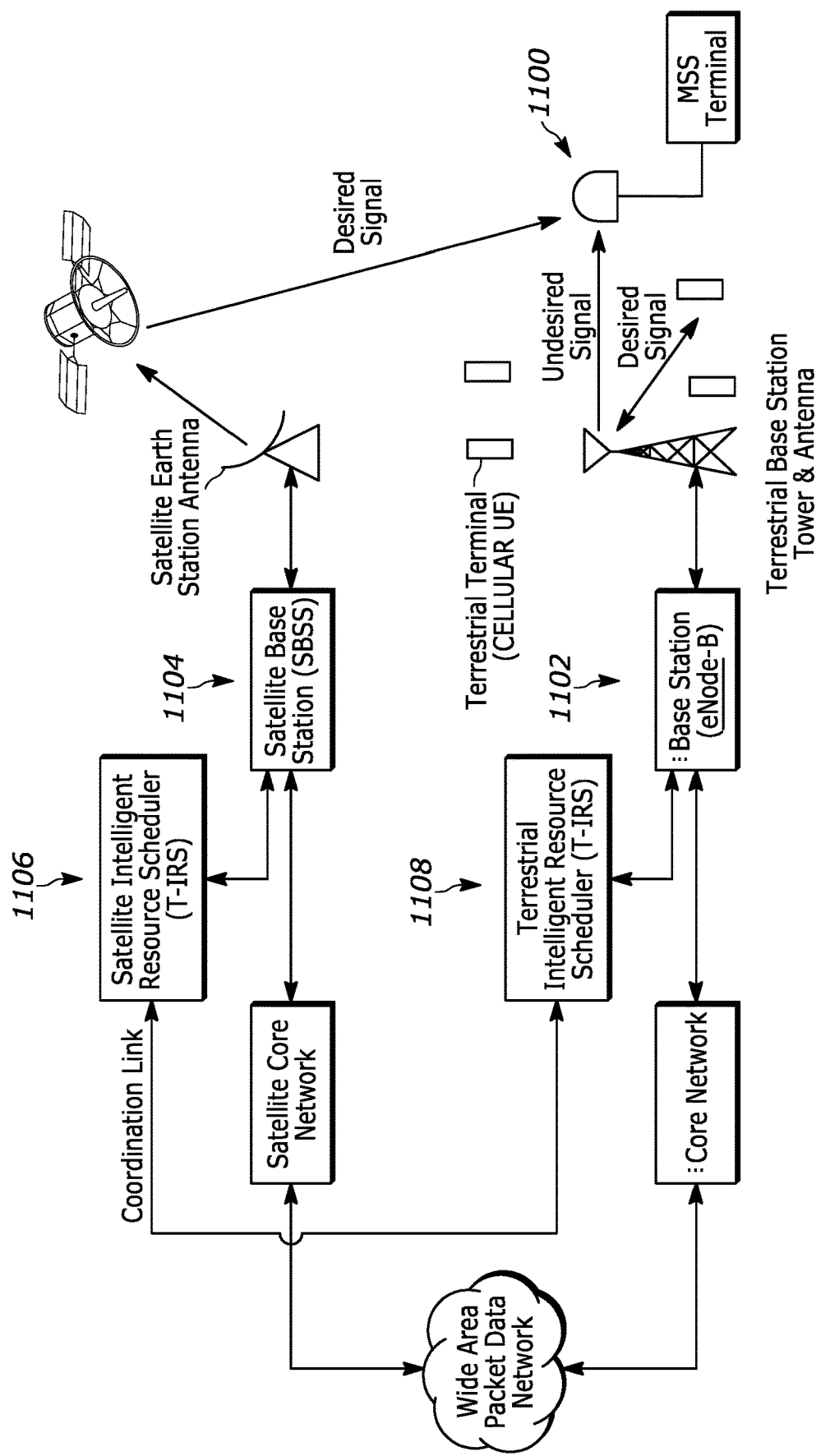
FIG. 11 illustrates a radio access network architecture for coordinated resource scheduling between a terrestrial cellular network and a mobile satellite network, according to some embodiments.

In another example embodiment, illustrated in FIG. 11, uplink transmissions from the satellite terminal 1100 may be deferred, or otherwise avoided, when the satellite terminal 1100 is expected to be proximate to a terrestrial base station 1102, when such deferment is permitted by the Quality of Service (QoS) requirements of the satellite traffic. As an example, consider an MSS network where the satellite base station 1104 is polling a large number of satellite terminals for position and other status reports every fifteen minutes. The satellite IRS 1106 is aware, from position reports provided by the satellite terminal 1100, that the satellite terminal 1100 is expected to pass sufficiently close to a base station 1102 to cause interference at a particular time of day, and would be near the base station 1102 for an estimated period of time (for example, approximately five minutes). The satellite IRS 1106 is informed of the terrestrial base station's location by the terrestrial IRS 1108. In such embodiments, the satellite IRS 1104 reorders (if required by the extant polling schedule), or otherwise modifies, its normal polling routine to avoid polling the mobile satellite terminal 1100 when it is proximate to the transmit base station 1102. Dynamic avoidance of uplink transmission at specific times may be applied to other radio resource scheduling algorithms wherever transmit time is a scheduled resource; the approach described herein is not limited to polling algorithms.

In another example embodiment, a satellite terminal 1100 uploading a large data file may, using its own intelligence, i.e., without being commanded by the satellite IRS 1106, withhold uplink transmissions when it is closer than a threshold distance from a base station.

Figure 13:
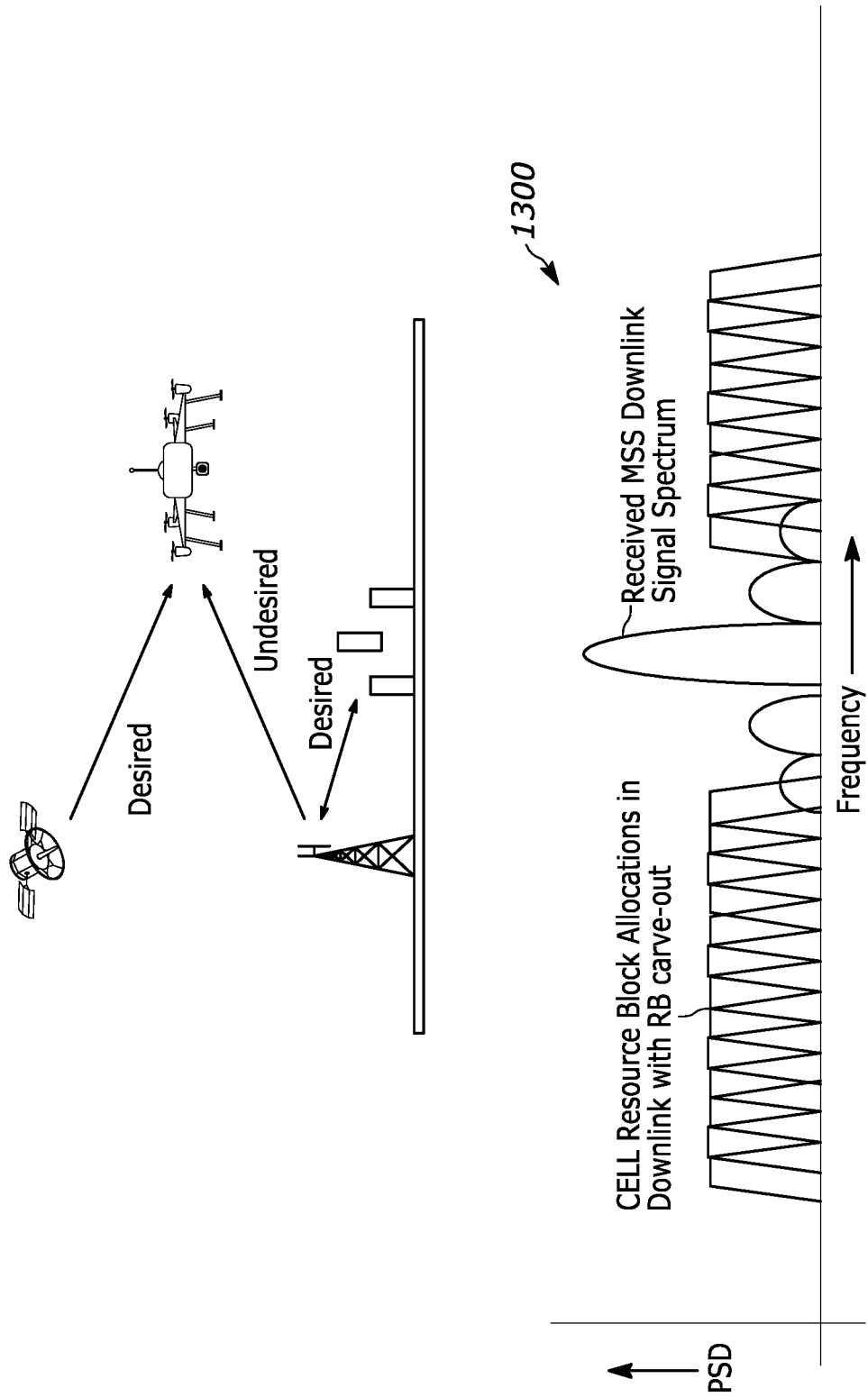
FIG. 13 illustrates a resource block carve-out in a terrestrial downlink to protect a satellite downlink using an intelligent resource scheduler, according to some embodiments.

In another example embodiment, location-aware coordinated resource allocation between the terrestrial and satellite networks is applied to protect the satellite downlink from interference from proximate base stations' downlink signals, as illustrated in FIG. 3 and FIG. 13 (See spectrum diagram 1300). As in the uplink carve out case, resource blocks may also be carved out in the terrestrial downlink signal to avoid interfering with the satellite downlink signal, using methods analogous to the uplink carve out embodiments. These include both permanent carve out and adaptive carve out dependent on the separation distance between the terrestrial base station and the satellite terminal. Similar to the uplink carve out embodiments, the downlink carve outs may also be based on (i) a propagation model, or (ii) a satellite terminal detecting the presence of the terrestrial base station's signal based on a known pilot signal in the cellular air interface. Downlink carveout is illustrated in FIG. 13.

Figure 12:
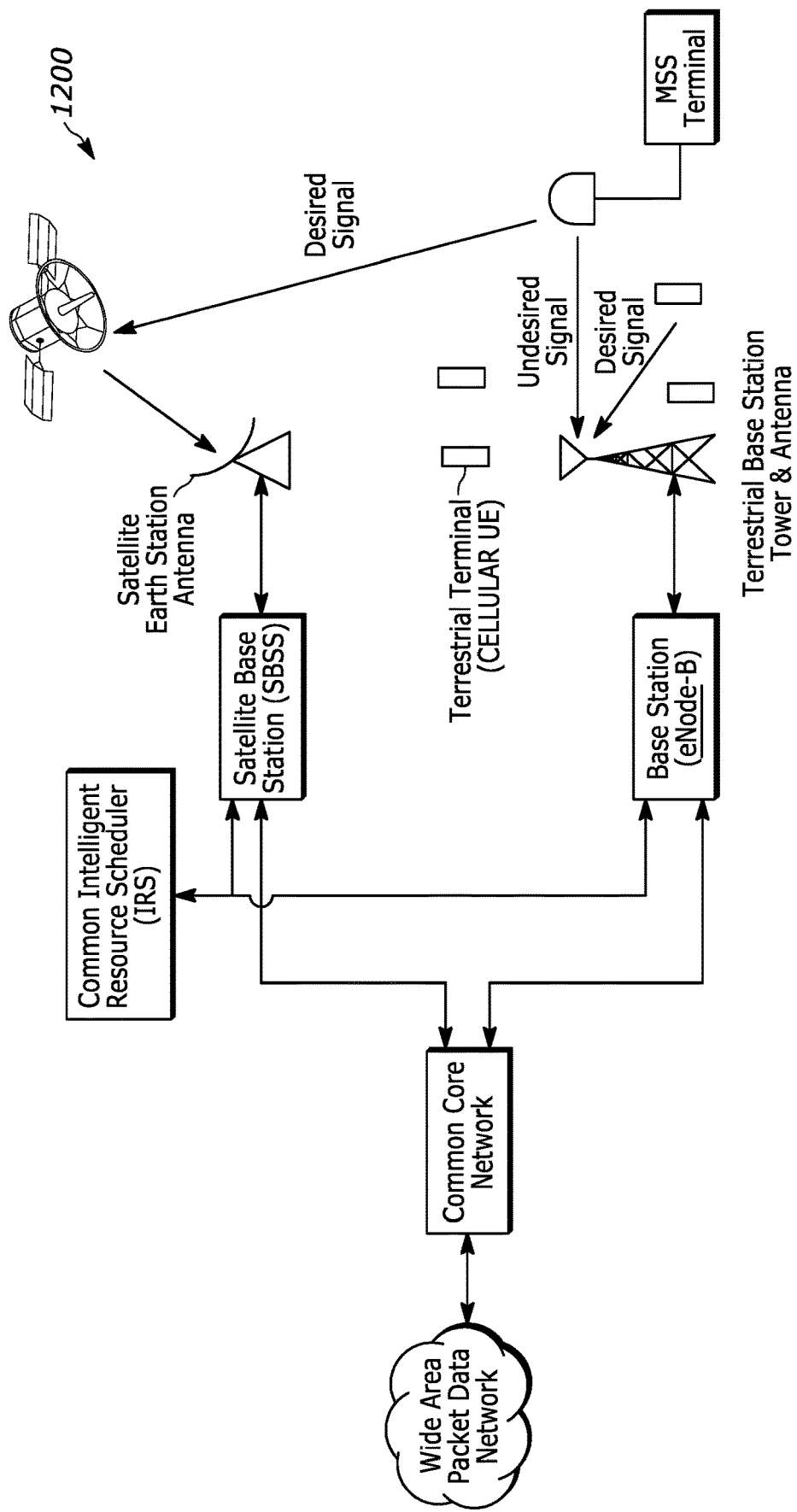
FIG. 12 illustrates a radio access network architecture for coordinated resource scheduling between a terrestrial cellular network and a mobile satellite network, according to some embodiments.

Embodiments involving intelligent satellite and terrestrial resource schedulers may be implemented with separate core networks and intelligent resource schedulers for each of the terrestrial and MSS networks, as illustrated in FIG. 11. Alternatively, in some embodiments, a common core network and common intelligent resource scheduler may be used, as illustrated in FIG. 12 (See block diagram 1200).

The following are enumerated examples of the systems and methods of the present disclosure for mitigating cochannel and adjacent channel interference between a terrestrial network and a mobile satellite network, operating in spectral and geographical proximity:

Example 1 provides a hybrid self-organizing network. The hybrid self-organizing network includes a cellular network including a cellular base station configured to perform at least one cellular interference mitigation measure. The cellular network is configured to provide wireless communications in a first frequency band within a first deployed area. The hybrid self-organizing network includes a mobile satellite network including a mobile satellite network terminal configured to perform at least one satellite interference mitigation measure. The mobile satellite network is configured to provide wireless communications in the first frequency band within a second deployed area separated from the first deployed area by a first standoff distance. Performance of one or both of the at least one cellular interference mitigation measure and the at least one satellite interference mitigation measure results in a second standoff distance that is less than the first standoff distance.

Example 2 is the hybrid self-organizing network of Example 1, wherein the at least one cellular interference mitigation measure includes at least one selected from the group consisting of adaptive receive antenna null steering, adaptive transmit antenna null steering, adaptive receiver interference cancellation, coordinated resource allocation; and wherein the at least one satellite interference mitigation measure includes at least one selected from the group consisting of adaptive receive antenna null steering, adaptive transmit antenna null steering, adaptive receiver interference cancellation, coordinated resource allocation.

Example 3 is the hybrid self-organizing network of any of Examples 1 and 2, wherein the cellular base station is configured to perform the at least one cellular interference mitigation measure independent of knowledge of a location of an interfering transmitter and a location of a receiver of interference.

Example 4 is the hybrid self-organizing network of any of Examples 1-3, wherein the mobile satellite network terminal is configured to perform the at least one satellite interference mitigation measure independent of knowledge of a location of an interfering transmitter and a location of a receiver of interference.

Example 5 is the hybrid self-organizing network of any of Examples 1-4, wherein the cellular base station is configured to perform the at least one cellular interference mitigation measure informed by knowledge of a location of an interfering transmitter and a location of a receiver of interference.

Example 6 is the hybrid self-organizing network of any of Examples 1-5, wherein the mobile satellite network terminal is configured to perform the at least one satellite interference mitigation measure informed by knowledge of a location of an interfering transmitter and a location of a receiver of interference.

Example 7 is the hybrid self-organizing network of any of Examples 1-6, wherein the mobile satellite network terminal includes an antenna array comprising a plurality of antennas, each feeding a radio frequency front end and an ADC. The ADCs are configured to receive copies of a radio frequency signal via the antenna array and the radio frequency front ends, and to convert the copies of the radio frequency signal to complex baseband samples. In some embodiments, the at least one satellite interference mitigation measure includes receiving, from the ADCs, the complex baseband samples, performing spatial signal processing on the complex baseband samples; and generating a receive beam based on a result of the spatial signal processing, the receive beam including a null directed toward at least one source of radio frequency interference.

Example 8 is the hybrid self-organizing network of Example 7, wherein generating the receive beam includes receiving, via the antenna array and the radio frequency front ends, a known pilot signal; and generating an antenna pattern based on minimizing the mean squared error between the received pilot signal and a locally generated copy of the known pilot signal.

Example 9 is the hybrid self-organizing network of Example 8, wherein the known pilot signal is a pseudo-random noise sequence embedded in a downlink signal.

Example 10 is the hybrid self-organizing network of any of Examples 1-7, wherein the cellular base station includes an antenna. The cellular base station is configured to execute the at least one interference mitigation measure by receiving a radio frequency signal from the mobile satellite terminal; autonomously determining an angle of arrival for the radio frequency signal; and generating a transmit beam based on the angle of arrival, the transmit beam including a null directed toward the mobile satellite network terminal.

Example 11 is the hybrid self-organizing network of any of Examples 1-7 and 10, wherein the cellular base station includes an antenna. The cellular base station is configured to execute the at least one interference mitigation measure by receiving information from the satellite network about a location of the mobile satellite network terminal; determining an angle of departure from the antenna toward the mobile satellite network terminal; and generating a transmit beam for the antenna based on the angle of departure, the transmit beam including a null directed toward the mobile satellite network terminal.

Example 12 is the hybrid self-organizing network of any of Examples 1-7, 10, and 11, wherein the cellular base station includes an antenna, a radio frequency front end, and an adaptive interference canceller coupled between the antenna and the radio frequency front end. The radio frequency front end is configured to execute the at least one cellular interference mitigation measure by receiving an input radio frequency signal from the antenna, filtering the input radio frequency signal with a bandpass filter; estimating an interference signal from the filtered input radio frequency signal; subtracting the interference signal from the filtered input radio frequency signal to generate an output signal; and transmitting the output signal to the radio frequency front end.

Example 13 is the hybrid self-organizing network of any of Examples 1-7 and 10-12, wherein the cellular network further includes a cellular intelligent resource scheduler communicatively coupled to the cellular base station, and the cellular intelligent resource scheduler is configured to determine a signal spectrum for the mobile satellite network; select subbands of a cellular signal which is substantially overlaid with the satellite signal spectrum; and excise the subbands from input signal to a receive processor of the cellular base station.

Example 14 is the hybrid self-organizing network of Example 13, wherein the cellular base station includes a cellular air interface configured to use orthogonal frequency division multiplexing and time-frequency resource blocks; and wherein the excised subbands comprise a discrete number of time-frequency resource blocks.

Example 15 is the hybrid self-organizing network of any of Examples 13 and 14, wherein the cellular air interface corresponds to a member of the LTE family of 3GPP air interfaces.

Example 16 is the hybrid self-organizing network of any of Examples 13 and 14, wherein the cellular air interface corresponds to a member of the 5G family of 3GPP air interfaces.

Example 17 is the hybrid self-organizing network of any of Examples 13 and 14, wherein the excised signal spectrum is one selected from the group consisting of an uplink signal spectrum and a downlink signal spectrum.

Example 18 is the hybrid self-organizing network of any of Examples 13 and 14, wherein the mobile satellite network includes a satellite intelligent resource scheduler as a component of the satellite hub. The satellite intelligent resource scheduler is configured to receive, from the mobile satellite terminal, a location for the mobile satellite terminal; and transmit, to the cellular intelligent resource scheduler, the location. The cellular intelligent resource scheduler is configured to receive, from the satellite intelligent resource scheduler, the location; determine a distance between the mobile satellite terminal and the cellular base station; and determine a plurality of cellular resource blocks to be excised based on the satellite signal spectrum and the distance.

Example 19 is the hybrid self-organizing network of Example 18, wherein the plurality of cellular resource blocks and the satellite signal spectrum correspond to the uplinks of the cellular and satellite networks.

Example 20 is the hybrid self-organizing network of Example 18, wherein the plurality of cellular resource blocks and the satellite signal spectrum correspond to the downlinks of the cellular and satellite networks.

Example 21 is the hybrid self-organizing network of any of Examples 1-7 and 10-13, wherein the mobile satellite network and the cellular network are communicatively coupled to a common core network; and the satellite intelligent resource scheduler and the cellular intelligent resource scheduler are integrated into a common intelligent resource scheduler.

Example 22 is the hybrid self-organizing network of any of Examples 1-7, 10-13, and 21, wherein the mobile satellite network includes a satellite intelligent resource scheduler communicatively coupled to the satellite core network and a satellite base station subsystem. The satellite intelligent resource scheduler is configured to receive, from the mobile satellite network terminal, a first location for the mobile satellite network terminal; receive, from the cellular intelligent resource scheduler, a second location for the cellular base station; and reorder a polling routine for the mobile satellite earth station based on the first and second location.

Example 23 is the hybrid self-organizing network of any of Examples 1-7,10-13, 21, and 22, wherein the cellular network and the mobile satellite network use signal spectra that are cochannel.

Example 24 is the hybrid self-organizing network of any of Examples 1-7,10-13, 21, and 22, wherein the cellular network and the mobile satellite network use signal spectra that are non-cochannel Example 25 provides a method for operating a hybrid network including a cellular network and a mobile satellite network. The method includes controlling the cellular network to provide wireless communications in a first frequency band within a first deployed area; controlling the mobile satellite network to provide wireless communications in the first frequency band within a second deployed area separated from the first deployed area by a first standoff distance; and executing at least one interference mitigation measure to produce a second standoff distance that is less than the first standoff distance.

Example 26 is the method of Example 25, wherein executing at least one interference mitigation measure includes executing at least one selected from the group consisting of adaptive receive antenna null steering, adaptive transmit antenna null steering, adaptive receiver interference cancellation, coordinated resource allocation.

Example 27 is the method of any of Examples 25 and 26, wherein executing at least one interference mitigation measure includes executing at least one interference mitigation measure independent of knowledge of a location of an interfering transmitter and a location of a receiver of interference.

Example 28 is the method of any of Examples 25-27, wherein executing at least one interference mitigation measure includes executing at least one interference mitigation measure informed by knowledge of a location of an interfering transmitter and a location of a receiver of interference.

Example 29 is the method of any of Examples 25-28, further including receiving, with an antenna array comprising a plurality of antennas, each feeding a radio frequency front end and an ADC, copies of a radio frequency signal; converting, with the ADC, the copies of the radio frequency signal to complex baseband samples; performing, with a digital signal processor, spatial signal processing on the complex baseband samples; and generating a receive beam for a mobile satellite network terminal based on a result of the spatial signal processing, the receive beam including a null directed toward at least one source of radio frequency interference.

Example 30 is the method of Example 29, wherein generating the receive beam includes receiving, via the antenna array and the radio frequency front ends, a known pilot signal; and generating an antenna pattern based on minimizing the mean squared error between the received pilot signal and a locally generated copy of the known pilot signal.

Example 31 is the method of Example 30, wherein receiving a known pilot signal includes receiving a pseudorandom noise sequence embedded in a downlink signal.

Example 32 is the method of any of Examples 25-29, further including receiving a radio frequency signal from the mobile satellite terminal; autonomously determining an angle of arrival for the radio frequency signal; and generating a transmit beam based on the angle of arrival, the transmit beam including a null directed toward the mobile satellite network terminal.

Example 33 is the method of Example 32, further including receiving, with the cellular base station, information from the satellite network about a location of the mobile satellite network terminal; determining an angle of departure from an antenna of the cellular base station toward the mobile satellite network terminal; and generating a transmit beam for the antenna based on the angle of departure, the transmit beam including a null directed toward the mobile satellite network terminal.

Example 34 is the method of any of Examples 25-29 and 32, further including receiving an input radio frequency signal from an antenna of the cellular base station; filtering the input radio frequency signal with a bandpass filter; estimating an interference signal from the filtered input radio frequency signal; subtracting the interference signal from the filtered input radio frequency signal to generate an output signal; and transmitting the output signal to the radio frequency front end.

Example 35 is the method of any of Examples 25-29, 32 and 34, further including determining a signal spectrum for the mobile satellite network; selecting, with a cellular intelligent resource scheduler communicatively coupled to the cellular base station, subbands of a cellular signal which is substantially overlaid with the satellite signal spectrum; and excising the subbands from input signal to a receive processor of the cellular base station.

Example 36 is the method of Example 35, wherein selecting subbands of a cellular signal includes selecting a discrete number of time-frequency resource blocks for a cellular air interface configured to use orthogonal frequency division multiplexing and time-frequency resource blocks.

Example 37 is the method of Example 36, wherein selecting subbands of a cellular signal includes selecting a discrete number of time-frequency resource blocks for a cellular air interface corresponding to a member of the LTE family of 3GPP air interfaces.

Example 38 is the method of Example 36, wherein selecting subbands of a cellular signal includes selecting a discrete number of time-frequency resource blocks for a cellular air interface corresponding to a member of the 5G family of 3GPP air interfaces.

Example 39 is the method of any of Example 35 and 36, wherein determining an excised signal spectrum includes determining one selected from the group consisting of an uplink signal spectrum and a downlink signal spectrum.

Example 40 is the method of any of Example 35 and 36, further including receiving, with a satellite intelligent resource scheduler as a component of a satellite hub, from the mobile satellite network terminal, a location for the mobile satellite network terminal; transmitting, to the cellular intelligent resource scheduler, the location; receiving, with the cellular intelligent resource scheduler, the location; determining, a distance between the mobile satellite network terminal and the cellular base station; and determining, with the cellular intelligent resource scheduler, a plurality of cellular resource blocks to be excised based on the satellite signal spectrum and the distance.

Example 41 is the method of Example 40, wherein the plurality of cellular resource blocks and the satellite signal spectrum correspond to the uplinks of the cellular and satellite networks.

Example 42 is the method of Example 40, wherein the plurality of cellular resource blocks and the satellite signal spectrum correspond to the downlinks of the cellular and satellite networks.

Example 43 is the method of any of Example 35 and 36, further including receiving, from the mobile satellite network terminal, a first location for the mobile satellite network terminal; receiving, from the cellular intelligent resource scheduler, a second location for the cellular base station; and reordering, a satellite intelligent resource scheduler communicatively coupled to the satellite core network and a satellite base station subsystem, a polling routine for a mobile satellite earth station based on the first and second location.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims. Additional information regarding various embodiments is contained in the attached Exhibits.

What is claimed is:

1. A hybrid self-organizing network, including:
   a cellular network including a cellular base station configured to
      sense first interference with respect to the cellular network, and
      responsive to sensing the first interference, perform at least one cellular interference mitigation measure, the cellular network configured to provide wireless communications in a first frequency band within a first deployed area; and
   a mobile satellite network including a mobile satellite network terminal configured to
      sense second interference with respect to the mobile satellite network, and
      responsive to sensing the second interference, perform at least one satellite interference mitigation measure, the mobile satellite network configured to provide wireless communications in the first frequency band within a second deployed area separated from the first deployed area by a first standoff distance;
   wherein performance of one or both of the at least one cellular interference mitigation measure and the at least one satellite interference mitigation measure results in a second standoff distance that is less than the first standoff distance, and
   wherein the cellular base station and the mobile satellite network terminal perform, respectively, the at least one cellular interference mitigation measure and the at least one satellite interference mitigation measure independently and in real time.

2. The hybrid self-organizing network of claim 1, wherein
   the at least one cellular interference mitigation measure includes at least one selected from a group consisting of adaptive receive antenna null steering, adaptive transmit antenna null steering, adaptive receiver interference cancellation, coordinated resource allocation; and
   wherein the at least one satellite interference mitigation measure includes at least one selected from a group consisting of adaptive receive antenna null steering, adaptive transmit antenna null steering, adaptive receiver interference cancellation, coordinated resource allocation.

3. The hybrid self-organizing network of claim 1, wherein the cellular base station is configured to perform the at least one cellular interference mitigation measure independent of knowledge of a location of an interfering transmitter and a location of a receiver of interference.

4. The hybrid self-organizing network of claim 1, wherein the mobile satellite network terminal is configured to perform the at least one satellite interference mitigation measure independent of knowledge of a location of an interfering transmitter and a location of a receiver of interference.

5. The hybrid self-organizing network of claim 1, wherein the cellular base station is configured to perform the at least one cellular interference mitigation measure informed by knowledge of a location of an interfering transmitter and a location of a receiver of interference.

6. The hybrid self-organizing network of claim 1, wherein the mobile satellite network terminal is configured to perform the at least one satellite interference mitigation measure informed by knowledge of a location of an interfering transmitter and a location of a receiver of interference.

7. The hybrid self-organizing network of claim 1, wherein the mobile satellite network terminal includes:
   an antenna array comprising a plurality of antennas, each feeding a radio frequency front end and an analog-to-digital converter (ADC);
   wherein the ADCs are configured to receive copies of a radio frequency signal via the antenna array and the radio frequency front ends, and to convert the copies of the radio frequency signal to complex baseband samples;
   wherein the at least one satellite interference mitigation measure includes
      receiving, from the ADCs, the complex baseband samples;
      performing spatial signal processing on the complex baseband samples; and
      generating a receive beam based on a result of the spatial signal processing, the receive beam including a null directed toward at least one source of radio frequency interference.

8. The hybrid self-organizing network of claim 7, wherein generating the receive beam includes
   receiving, via the antenna array and the radio frequency front ends, a known pilot signal; and
   generating an antenna pattern based on minimizing a mean squared error between the received known pilot signal and a locally generated copy of the known pilot signal.

9. The hybrid self-organizing network of claim 8, wherein the known pilot signal is a pseudo-random noise sequence embedded in a downlink signal.

10. The hybrid self-organizing network of claim 1, wherein
   the cellular base station includes an antenna; and
   the cellular base station is configured to execute the at least one interference mitigation measure by
      receiving a radio frequency signal from the mobile satellite terminal;
      autonomously determining an angle of arrival for the radio frequency signal; and
      generating a transmit beam based on the angle of arrival, the transmit beam including a null directed toward the mobile satellite network terminal.

11. The hybrid self-organizing network of claim 1, wherein
 the cellular base station includes an antenna; and
 the cellular base station is configured to execute the at least one interference mitigation measure by
  receiving information from the mobile satellite network about a location of the mobile satellite network terminal; and
  determining an angle of departure from the antenna toward the mobile satellite network terminal; and
  generating a transmit beam for the antenna based on the angle of departure, the transmit beam including a null directed toward the mobile satellite network terminal.

12. The hybrid self-organizing network of claim 1, wherein the cellular base station includes:
 an antenna;
 a radio frequency front end; and
 an adaptive interference canceller coupled between the antenna and the radio frequency front end, and configured to execute the at least one cellular interference mitigation measure by
  receiving an input radio frequency signal from the antenna;
  filtering the input radio frequency signal with a bandpass filter;
  estimating an interference signal from the filtered input radio frequency signal;
  subtracting the interference signal from the filtered input radio frequency signal to generate an output signal; and
  transmitting the output signal to the radio frequency front end.

13. The hybrid self-organizing network of claim 1, wherein the cellular network further includes a cellular intelligent resource scheduler communicatively coupled to the cellular base station, the cellular intelligent resource scheduler configured to:
 determine a signal spectrum for the mobile satellite network;
 select one or more subbands of a cellular signal which is substantially overlaid with the signal spectrum; and
 excise the one or more subbands from an input signal to a receive processor of the cellular base station.

14. The hybrid self-organizing network of claim 13, wherein the cellular base station includes a cellular air interface configured to use orthogonal frequency division multiplexing and time-frequency resource blocks; and
 wherein the one or more excised subbands comprise a discrete number of time-frequency resource blocks.

15. The hybrid self-organizing network of claim 14, wherein the cellular air interface corresponds to a member of the LTE family of 3GPP air interfaces.

16. The hybrid self-organizing network of claim 14, wherein the cellular air interface corresponds to a member of the 5G family of 3GPP air interfaces.

17. The hybrid self-organizing network of claim 13, wherein the one or more excised subbands include a signal spectrum that is one selected from a group consisting of an uplink signal spectrum and a downlink signal spectrum.

18. The hybrid self-organizing network of claim 13, wherein the mobile satellite network includes a satellite intelligent resource scheduler as a component of a satellite hub,
 wherein the satellite intelligent resource scheduler is configured to
  receive, from the mobile satellite terminal, a location for the mobile satellite terminal; and
  transmit, to the cellular intelligent resource scheduler, the location;
 wherein the cellular intelligent resource scheduler is configured to
  receive, from the satellite intelligent resource scheduler, the location;
  determine a distance between the mobile satellite terminal and the cellular base station; and
  determine a plurality of cellular resource blocks to be excised based on the signal spectrum and the distance.

19. The hybrid self-organizing network of claim 18, wherein the plurality of cellular resource blocks and the signal spectrum correspond to an uplink of the cellular network and an uplink of the mobile satellite network.

20. The hybrid self-organizing network of claim 18, wherein the plurality of cellular resource blocks and the signal spectrum correspond to a downlink of the cellular network and a downlink of the mobile satellite network.

21. The hybrid self-organizing network of claim 18, wherein
 the mobile satellite network and the cellular network are communicatively coupled to a common core network; and
 the satellite intelligent resource scheduler and the cellular intelligent resource scheduler are integrated into a common intelligent resource scheduler.

22. The hybrid self-organizing network of claim 13, wherein
 the mobile satellite network includes a satellite intelligent resource scheduler communicatively coupled to a core network of the mobile satellite network and a satellite base station subsystem; and
 the satellite intelligent resource scheduler is configured to
  receive, from the mobile satellite network terminal, a first location for the mobile satellite network terminal;
  receive, from the cellular intelligent resource scheduler, a second location for the cellular base station; and
  reorder a polling routine for a mobile satellite earth station based on the first and second location.

23. The hybrid self-organizing network of claim 1, wherein the cellular network and the mobile satellite network use signal spectra that are cochannel.

24. The hybrid self-organizing network of claim 1, wherein the cellular network and the mobile satellite network use signal spectra that are non-cochannel.

25. A method for operating a hybrid network including a cellular network and a mobile satellite network, the method including:
 controlling the cellular network to provide wireless communications in a first frequency band within a first deployed area;
 controlling the mobile satellite network to provide wireless communications in the first frequency band within a second deployed area separated from the first deployed area by a first standoff distance
 sensing interference with the wireless communications in the first frequency band and in at least one of the first deployed area or the second deployed area; and
 responsive to sensing interference, executing at least one cellular interference mitigation measure and at least one satellite interference mitigation measure to produce a second standoff distance that is less than the first standoff distance, wherein the cellular base station and the mobile satellite network terminal perform, respectively, the at least one cellular interference mitigation measure and the at least one satellite interference mitigation measure independently and in real time.

26. The method of claim 25, wherein executing at least one interference mitigation measure includes executing at least one selected from a group consisting of adaptive receive antenna null steering, adaptive transmit antenna null steering, adaptive receiver interference cancellation, coordinated resource allocation.

27. The method of claim 25, wherein executing at least one interference mitigation measure includes executing at least one interference mitigation measure independent of knowledge of a location of an interfering transmitter and a location of a receiver of interference.

28. The method of claim 25, wherein executing at least one interference mitigation measure includes executing at least one interference mitigation measure informed by knowledge of a location of an interfering transmitter and a location of a receiver of interference.

29. The method of claim 25, further comprising:
receiving, with an antenna array comprising a plurality of antennas, each feeding a radio frequency front end and an analog-to-digital converter (ADC), copies of a radio frequency signal;
converting, with the ADC, the copies of the radio frequency signal to complex baseband samples;
performing, with a digital signal processor, spatial signal processing on the complex baseband samples; and
generating a receive beam for a mobile satellite network terminal based on a result of the spatial signal processing, the receive beam including a null directed toward at least one source of radio frequency interference.

30. The method of claim 29, wherein generating the receive beam includes:
receiving, via the antenna array and the radio frequency front ends, a known pilot signal; and
generating an antenna pattern based on minimizing a mean squared error between the received known pilot signal and a locally generated copy of the known pilot signal.

31. The method of claim 30, wherein receiving the known pilot signal includes receiving a pseudo-random noise sequence embedded in a downlink signal.

32. The method of claim 25, further comprising:
receiving a radio frequency signal from a mobile satellite terminal of the mobile satellite network;
autonomously determining an angle of arrival for the radio frequency signal; and
generating a transmit beam based on the angle of arrival, the transmit beam including a null directed toward the mobile satellite network terminal.

33. The method of claim 32, further comprising:
receiving, with a cellular base station of the cellular network, information from the mobile satellite network about a location of the mobile satellite network terminal;
determining an angle of departure from an antenna of the cellular base station toward the mobile satellite network terminal; and
generating a transmit beam for the antenna based on the angle of departure, the transmit beam including a null directed toward the mobile satellite network terminal.

34. The method of claim 25, further comprising:
receiving an input radio frequency signal from an antenna of a cellular base station of the cellular network;
filtering the input radio frequency signal with a bandpass filter;
estimating an interference signal from the filtered input radio frequency signal;
subtracting the interference signal from the filtered input radio frequency signal to generate an output signal; and
transmitting the output signal to a radio frequency front end of the cellular base station.

35. The method of claim 25, further comprising:
determining a signal spectrum for the mobile satellite network;
selecting, with a cellular intelligent resource scheduler communicatively coupled to a cellular base station of the cellular network, one or more subbands of a cellular signal which is substantially overlaid with the signal spectrum; and
excising the one or more subbands from an input signal to a receive processor of the cellular base station.

36. The method of claim 35, wherein selecting the one or more subbands of the cellular signal includes selecting a discrete number of time-frequency resource blocks for a cellular air interface of the cellular base station configured to use orthogonal frequency division multiplexing and time-frequency resource blocks.

37. The method of claim 36, wherein selecting subbands of a cellular signal includes selecting a discrete number of time-frequency resource blocks for a cellular air interface corresponding to a member of the LTE family of 3GPP air interfaces.

38. The method of claim 36, wherein selecting subbands of a cellular signal includes selecting a discrete number of time-frequency resource blocks for a cellular air interface corresponding to a member of the 5G family of 3GPP air interfaces.

39. The method of claim 35, wherein determining an excised signal spectrum includes determining one selected from a group consisting of an uplink signal spectrum and a downlink signal spectrum.

40. The method of claim 35, further comprising:
receiving, with a satellite intelligent resource scheduler as a component of a satellite hub, from the mobile satellite network terminal, a location for the mobile satellite network terminal;
transmitting, to the cellular intelligent resource scheduler, the location;
receiving, with the cellular intelligent resource scheduler, the location;
determining, a distance between the mobile satellite network terminal and the cellular base station; and
determining, with the cellular intelligent resource scheduler, a plurality of cellular resource blocks to be excised based on the signal spectrum and the distance.

41. The method of claim 40, wherein the plurality of cellular resource blocks and the signal spectrum correspond to an uplink of the cellular network and an uplink of the mobile satellite network.

42. The method of claim 40, wherein the plurality of cellular resource blocks and the signal spectrum correspond to a downlink of the cellular network and a downlink of the mobile satellite network.

43. The method of claim 35, further comprising:
receiving, from the mobile satellite network terminal, a first location for the mobile satellite network terminal;
receiving, from the cellular intelligent resource scheduler, a second location for the cellular base station; and
reordering, with a satellite intelligent resource scheduler communicatively coupled to a satellite core network and a satellite base station subsystem, a polling routine for a mobile satellite earth station based on the first and second location.

* * * * *